(12) United States Patent
Buckler et al.

(10) Patent No.: US 7,730,091 B2
(45) Date of Patent: Jun. 1, 2010

(54) SYSTEMS, METHODS AND COMPUTER PRODUCTS FOR DATABASE CLUSTER MODELING

(75) Inventors: Andrew D. Buckler, Markham (CA); Dale M. McInnis, Aurora (CA); Subho Chatterjee, North York (CA); Steve Raspudic, Mississauga (CA); Anand Subramanian, Markham (CA)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 11/848,783

(22) Filed: Aug. 31, 2007

(65) Prior Publication Data

US 2009/0063123 A1 Mar. 5, 2009

(51) Int. Cl.
  G06F 7/00 (2006.01)
  G06F 17/30 (2006.01)
(52) U.S. Cl. ............... 707/782; 707/781; 707/610; 707/634; 714/1; 714/2; 714/4
(58) Field of Classification Search .............. 707/10, 707/8, 9, 200, 204, 100; 714/1, 2, 4; 709/238, 709/229, 223
  See application file for complete search history.

(56) References Cited

U.S. PATENT DOCUMENTS

| | | | | |
|---|---|---|---|---|
| 6,014,669 | A * | 1/2000 | Slaughter et al. | ............... 707/10 |
| 6,393,485 | B1 * | 5/2002 | Chao et al. | ............... 709/231 |
| 6,438,705 | B1 * | 8/2002 | Chao et al. | ............... 714/4 |
| 7,039,827 | B2 * | 5/2006 | Meyer et al. | ............... 714/4 |
| 7,640,451 | B2 * | 12/2009 | Meyer et al. | ............... 714/4 |
| 2002/0007468 | A1 * | 1/2002 | Kampe et al. | ............... 714/4 |
| 2003/0212520 | A1 * | 11/2003 | Campos et al. | ............... 702/101 |
| 2003/0212692 | A1 * | 11/2003 | Campos et al. | ............... 707/100 |
| 2003/0212693 | A1 * | 11/2003 | Campos et al. | ............... 707/100 |
| 2004/0010497 | A1 * | 1/2004 | Bradley et al. | ............... 707/100 |
| 2004/0153708 | A1 * | 8/2004 | Joshi et al. | ............... 714/4 |
| 2005/0027721 | A1 * | 2/2005 | Saenz | ............... 707/100 |
| 2005/0108593 | A1 | 5/2005 | Purushothaman et al. | |

(Continued)

OTHER PUBLICATIONS

Troy Anthony et al.; "Oracle Clusterware and RAC Administration and Deployment Guide 10 g Release"; Jan. 2006;Oracle.*

(Continued)

*Primary Examiner*—Tony Mahmoudi
*Assistant Examiner*—Dennis Truong
(74) *Attorney, Agent, or Firm*—Cantor Colburn LLP; Justin Dillon

(57) ABSTRACT

Generating in a computer system and deploying a data model of a plurality of database cluster configuration availability solutions over a computer network by creating a database cluster configuration modeling specification including objects contained in a unified model language diagram providing a definition of a database cluster configuration data model. Creating the database cluster configuration data model using the database cluster configuration modeling specification and upon receiving signals from a graphical user interface or from XML batch data files or from application programming interfaces, indicating the definition of the cluster configuration model. After creating the graphical database cluster configuration data model, constraints that specify a valid logical configuration are validated and the solution is transformed into data understandable by database cluster manager software applications and then transmitted over a network to multiple cluster manager targets to be incorporated as database cluster configuration availability solutions.

6 Claims, 2 Drawing Sheets

U.S. PATENT DOCUMENTS

2006/0248198 A1* 11/2006 Galchev .................... 709/227
2007/0067318 A1* 3/2007 Wolafka et al. ............ 707/100
2007/0156789 A1* 7/2007 Semerdzhiev et al. ...... 707/204
2008/0140549 A1* 6/2008 Eder .......................... 705/35
2008/0215718 A1* 9/2008 Stolorz et al. .............. 709/223
2008/0250267 A1* 10/2008 Brown et al. ................... 714/4
2009/0063501 A1* 3/2009 Buckler et al. ................ 707/10

OTHER PUBLICATIONS

DongInn Kim et al.; "Revamping the OScar Database: A Flexable Approach to Cluster Configuration Data Management"; Apr. 18, 2005; 2005 IEEE.*

* cited by examiner

SYSTEMS, METHODS AND COMPUTER PRODUCTS FOR DATABASE CLUSTER MODELING

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety: U.S. patent application Ser. No. 11/849,021.

TRADEMARKS

IBM® is a registered trademark of the International Business Machines Corporation, Armonk, N.Y., U.S.A. Other names used herein may be trademarks and registered trademarks, or trade or product names of International Business Machines Corporation or other companies.

TECHNICAL FIELD

The exemplary embodiments relate generally to networked computer system administration and management, relating to storage management. More particularly, the exemplary embodiments relate to generating and graphically displaying database cluster configuration modeling solutions, for database cluster requirements. The exemplary embodiments can be applied to any system running any service provider application.

BACKGROUND

In general, clusters are groups of computer systems, which can provide advantages in availability (service uptime) through redundant hardware. For example, if systems A and B are in a cluster together and system A fails, then its workload can be relocated to system B. In clusters that involve more systems (or "nodes" in cluster parlance), the specification of the workload relocation can be more complex. Clusters manage "resource groups", which are taken to be a collection of resources (hardware or software) that provide a service to clients and can be treated as a unit. The specification of the full configuration model of a cluster and DB2 instances contained within it can be both error prone and time consuming, given the large amount of data which must be specified. This is further complicated by the fact that different cluster managers (the software packages that manage clusters) have different models of the software and hardware that the cluster contains; for example, Oracle's RAC system provides a clustered database manager instance and comes with associated configuration tooling. However, as of the 10 g release it appears that the hardware (node/NIC/network) and database configuration steps are handled by separate tools. RAC is also tightly coupled with Oracle's own cluster manager and thus provides no cluster-independent abstraction. Additionally, most database administrators are not familiar with clustering or its associated terminology, which creates usability issues when databases must be clustered. These problems have been observed in general in many types of service provider networked database cluster applications. Thus, problems with configuring networked database clusters for high availability are not limited to the above mentioned applications. Other applications and vendors are similarly affected.

Therefore, the need exists for a modeling system that permits the user to specify the configuration of a clustered database instance in terms of familiar hardware (node/system, network interface, network) and database (instance, database, path) objects; thus, causing the specification of the full configuration model of a cluster and DB2 instances contained within to contain few errors and take a reduced amount of time to prepare, given the large amount of data which must be specified.

Further the need exists for a modeling system where these objects are contained in a unified model where the configuration is specified at a logical level that is independent of the 3rd party cluster manager, which manages the configuration. This provides a complete specification of the cluster configuration within a single modeling tool for specifying the configuration of different cluster managers that have different models of software and hardware and permits the user to take a logical "snapshot" of the cluster's configuration.

Finally, the need exists for a modeling system that allows for easy version-to-version migrations of DB2 instances, which can require different specifications to the underlying cluster manager, as well as simplifying cluster manager to cluster manager migrations, because most database administrators are not familiar with clustering or its associated terminology, which creates usability issues when databases must be clustered.

SUMMARY OF THE INVENTION

A method and system of generating, by a computer processor, a plurality of logical symbolic representations comprising a single model of an entire database cluster (hardware and software). This representation of the single model of the entire database cluster is specified logically and independent of the cluster managers' individual models. Cluster availability solutions are derived from use of the representation of the single model of the entire database cluster and a plurality of database cluster configuration modeling solutions can be displayed on a computer display, then the entire database cluster configuration modeling solutions can be transmitted and deployed over a network to multiple cluster managers; where, in any given cluster, there is only a single cluster manager in use. The core operations of the method include creating a database cluster configuration modeling specification including objects and paths contained in a unified model diagram, which provides a definition of a database cluster configuration model, from which a data model of the database cluster configuration modeling solution is built. The data model of the database cluster configuration is created from the sub operations of receiving the definition of the database cluster configuration model either through a user interface (UI) or from an XML file or from the cluster manager via API calls. The user interface can be any one or more of a text based user interface, a graphical user interface (GUI), an interactive GUI or any variation of an interactive, configuration, text and/or graphical user interface. The definition can also be received from Extensible Markup Language (XML) batch data files or from an existing database cluster through an application programming interface. From the definition, a database cluster configuration data model is built. Constraints are checked that specify a valid logical database cluster configuration for the data model. Then after displaying the valid logical database cluster configuration, said configuration is transformed from a data model to data easily understood by cluster management software, i.e., cluster managers and the transformed solution is transmitted over a network to multiple cluster managers as a single configuration model that can be used to manage multiple database cluster instances on the network; however, in any given cluster, there is only a single cluster manager in use. Once a logical model is configured and verified to be valid against a set of constraints, the service provider transforms the logical model into a form that is transmitted to and understood by cluster managers. The logical model is specified in a cluster manager independent fashion, so this step has to determine what each object and/or connection between objects in the logical model represents in the cluster manager's configuration model. This specification in terms of the cluster manager's configuration model is then sent to the cluster manager via API calls (which are also cluster manager specific). The entire unified model language diagram of the database cluster definition that is used to create the dynamic data model representing the plurality of database cluster configuration modeling solutions can be displayed, enabling a user to visualize and/or edit the dynamic database cluster solutions that are implemented over the network. The above operations and sub operations can be repeated at any stage of any one of the operations and/or sub operations for generating a data model of a plurality of database cluster configuration availability solutions or the operations and sub operations end when the constraints are satisfied and when there are no more solutions required, thus completing the operations.

BRIEF DESCRIPTION OF THE DRAWINGS

The subject matter that is regarded as the exemplary embodiments are particularly pointed out and distinctly claimed in the claims at the conclusion of the specification. The foregoing and other objects, features, and advantages of the exemplary embodiments are apparent from the following detailed description taken in conjunction with the accompanying drawings, which are meant to be exemplary, and not limiting, wherein:

DETAILED DESCRIPTION

Exemplary embodiments of the method and system of generating, displaying and transmitting, by a computer processor over a network, a plurality of logical symbolic representations (including, representing generalized tree data structures in which nodes may have more than one parent; other representations can also be used) of a plurality of database cluster high availability configuration modeling solutions to an operator and/or user are described in detail below. The disclosed exemplary embodiments are intended to be illustrative only, since numerous modifications and variations therein will be apparent to those of ordinary skill in the art. In reference to the drawings, like numbers will indicate like parts continuously throughout the view. The exemplary embodiments disclosed herein address problems in service uptime availability of groups of computer systems including database operations (referred to herein as "database clusters"). The disclosed exemplary embodiments can be applied to any system running any service provider application. Further, the terms "a", "an", "first", "second" and "third" etc., herein do not denote limitations of quantity, but rather denote the presence of one or more of the referenced item(s).

Figure 1:
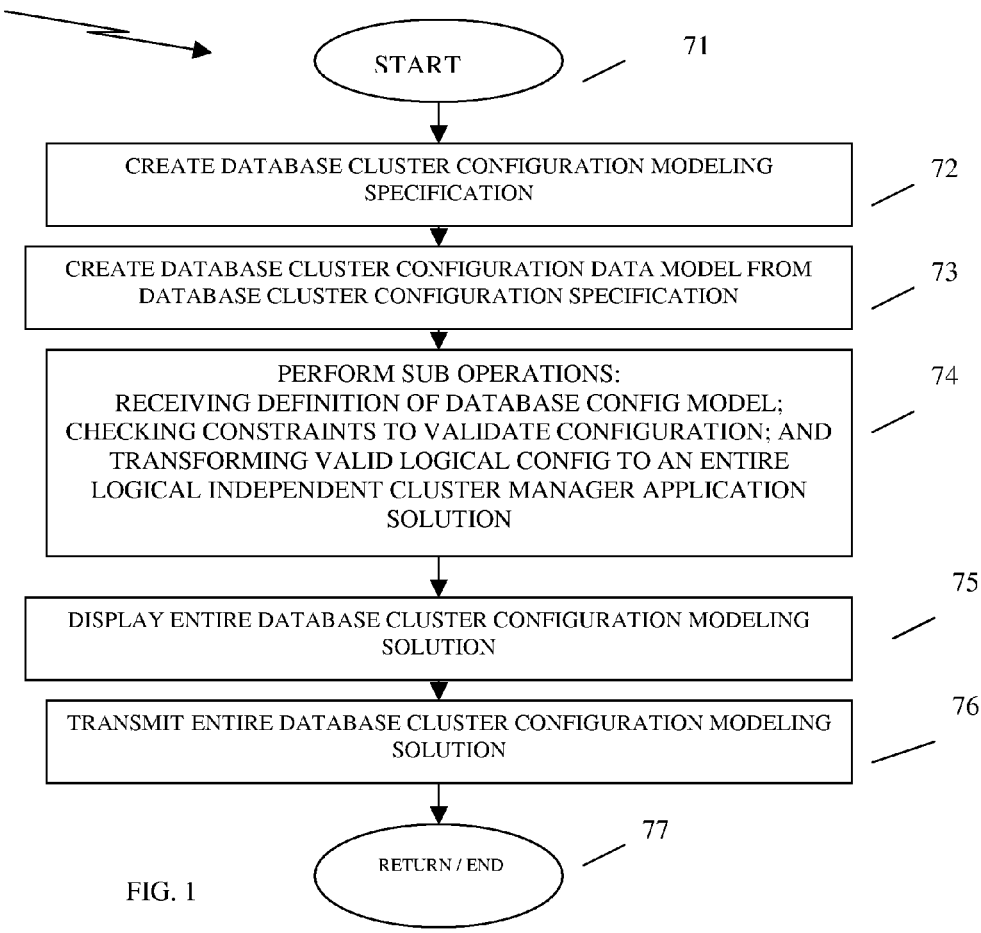
FIG. 1 illustrates operations of the database cluster configuration modeling solution method.
Figure 2:
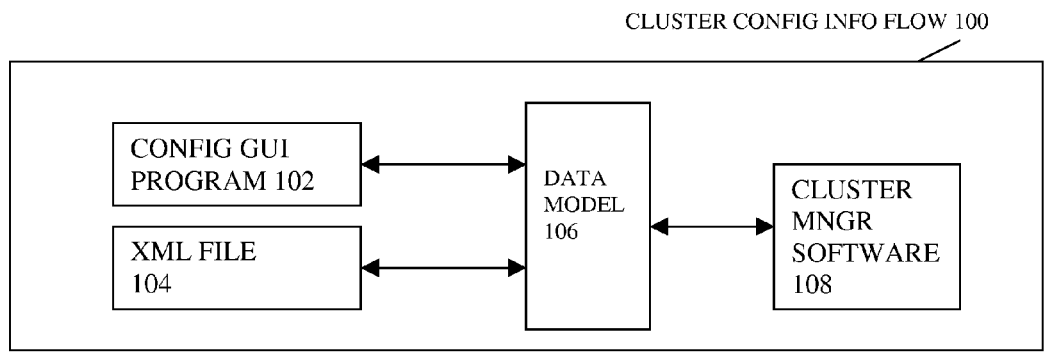
FIG. 2 illustrates cluster configuration information flow of an entire solution.
Figure 3:
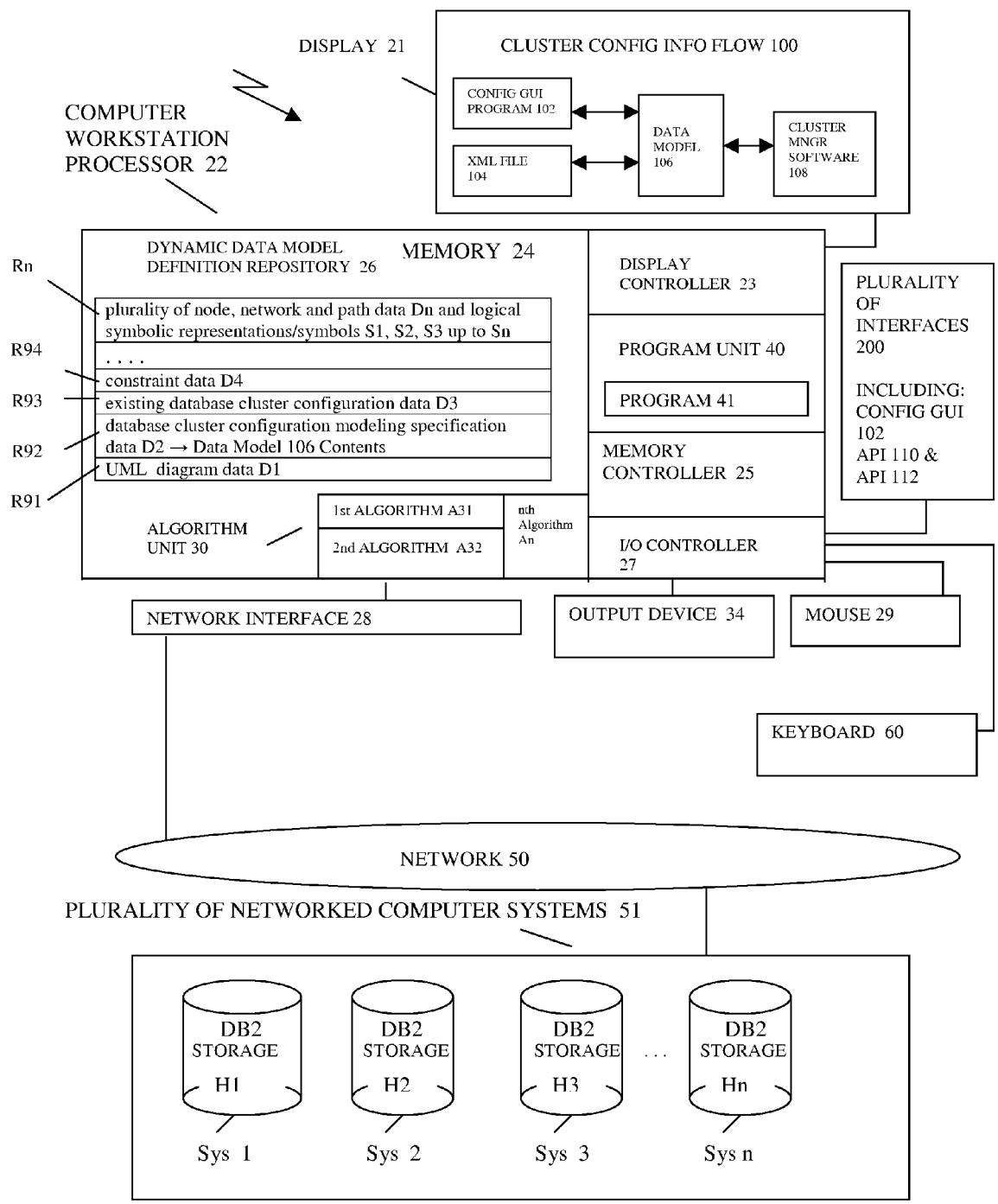
FIG. 3 illustrates the system implementing operations and sub operations of the method illustrated in FIG. 1.

A database cluster configuration modeling solution method 70 (herein referred to as "method 70") and a database cluster configuration modeling solution system 20 (herein referred to as "system 20") in a computer system network (herein referred to as "Network 50") are illustrated in FIGS. 1 and 3 respectively. FIG. 2 illustrates a graphical image of a database cluster configuration information flow (herein referred to as "cluster config info flow 100").

Referring to FIG. 3, system 20 includes computer workstation processor 22, which contains memory 24. Algorithm unit 30 resides in memory 24 and contains a plurality of algorithms including first algorithm A31 and second algorithm A32 up to nth algorithm An. Also, residing in computer workstation processor 22 is program unit 40, containing program 41. Memory 24 also contains a dynamic data model definition repository 26, which contains a plurality of repository entry locations R91, R92, R93, R94 and up to Rn, which hold and/or store unified modeling language (UML) diagram data D1, which represents the data shown in Table 1 and Table 2; database cluster configuration modeling specification data D2, which maps to the contents of Data Model 106 in cluster config info flow 100; existing database cluster configuration data D3; constraint data D4 up to a plurality of dynamic node, network and path data Dn and node, network and path logical symbolic representations/symbols S1, S2, S3 respectively up to Sn. Note: dynamic data model definition repository 26 can be actual or virtual memory either on-board or external to computer workstation processor 22.

In the exemplary embodiments, system 20 includes a combination of controllers including display controller 23, memory controller 25 and input/output (I/O) controller 27, a plurality of interfaces 200 including interfaces cooperatively connected and implemented by either software and/or hardware to a database cluster configuration graphical user interface program 102 (herein referred to interchangeably as ("config GUI program 102") implemented by either software and/or hardware and a set of application programming interfaces (herein referred to as "API 110 and API 112") implemented by either software and/or hardware and a combination of computer peripheral devices cooperatively coupled to system 20 including display 21, a set of input devices including keyboard 60 and mouse 29, network interface 28, and output device 34, via standard interface connectivity. Network interface 28 cooperatively couples computer workstation processor 22 via network 50 (where network 50 can be a wide area network such as the Internet or a local area network, including an intranet or an extranet) to a plurality of networked computer systems 51 including a plurality of DB2 database storage devices H1, H2, H3 up to Hn in a cluster configuration physically, virtually or logically implemented as a plurality of DB2 storage systems on network 50, including sys 1, sys 2, sys 3 up to sys n, used in data storage and retrieval operations.

Display 21 can render displays of the following: graphical images and/or text representing unified modeling language (UML) diagrams (herein referred to interchangeably as "unified modeling diagrams"); graphical images and/or text representing database cluster configuration modeling specifications; graphical images and/or text representing a plurality of database cluster configuration data modeling solutions, including objects and paths contained in the unified model diagram, included in Table 1 and Table 2, providing a definition of a database cluster configuration model, where the objects include nodes, networks, network interfaces and paths, which are represented by boxes, arrows and lines. In the exemplary embodiments, FIG. 2 illustrates a graphical image of a database cluster configuration information flow (i.e., cluster config info flow 100), which represents three bidirectional bijective/reversible sources of configuration information flow, where logical configuration information can be either pulled from or sent to any and/or each of these sources, where the config GUI program 102 can be a program communicating with program 41 and the data model 102 is a source and the XML file 104 is a source and the cluster manager software 108 is a source; further, data model 106 would be the address space for the configuration GUI 102 program. is a source and the XML file 104 is a source and the cluster manager software 108 is a source. Cluster manager software 108 is a program communicating with program 41 by way of API calls or calls to routines and/or algorithms. Further, data model 106 serves as a central repository in the database cluster configuration information flow 100, where the logical building blocks of possible multiple high availability solutions for multiple DB2 storage systems reside, as illustrated in FIG. 2 and FIG. 3. Furthermore, display 21 can display a graphical rendering of the data model 106, as illustrated in FIG. 3. The unified model diagram of a model database clustered instance configuration definition is shown below in two parts; the first part in TABLE 1 and the second part in TABLE 2. The UML diagrams are a visual representation of the structure of the data model 106 graph that the service provider is building. In the bottom left box in Table 1, there is an "Interface" that is connected to "Node" and "Physical Network" boxes, which indicate that the Interface node in the graph is the child of a single Node mode and is also a child of a single Physical Network. The multiplicities on these connections also indicate that a Node may be the parent of N Interfaces, and a Physical Network can be the parent of between 2 and N Interfaces. The data listed within the Nodes, Interface, Physical Network, and the rest of the boxes indicate the set of information that each node of that type in the network contains. The complete set of such nodes and their interconnections form the data model 106 graph that models the database cluster configuration that is built form the combination of the existing database cluster configuration data D3 (pulled from the cluster manager software 108) and/or the XML file 104 and/or the user input from the interactive configuration GUI program 102 all illustrated in the database cluster configuration information flow 100 of FIG. 2.

TABLE 1

First Part of Unified Model Diagram of Database Clustered Instance Configuration Definition of Parent Child Relationships

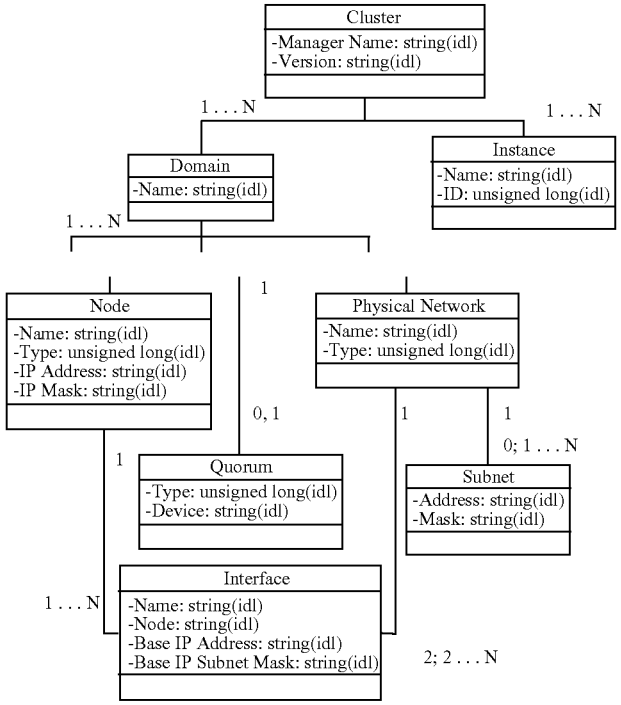

TABLE 2

Second Part of Unified Model Diagram of Database Clustered Instance Configuration
Definition of Parent Child Relationships

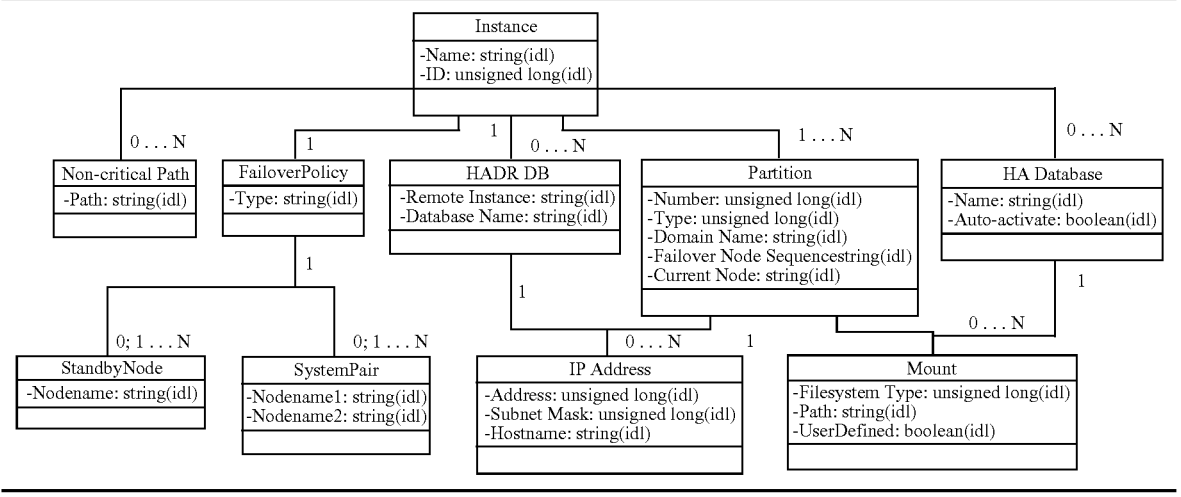

Table 1 and Table 2 compose the unified modeling language diagram data D1 stored in repository entry location R91 of the dynamic data model definition repository 26 included in computer workstation processor 22. The core of method 70 and system 20 is a graph that models the clustered instance's configuration. The two unified modeling diagrams in Tables 1 and 2 above show one possible structure for this model graph, i.e., the UML diagram composed of Tables 1 and 2 describe the structure of the graph the service provider operator of system 20 can build. The two unified modeling diagrams are divided and shown in two tables for convenience of layout alone. The Instance node in Table 2 is the same Instance node in the Table 1; however, in Table 2 the Instance node is expanded out to show the dependencies, i.e., the parent child relationships under the Instance node. Internally system 20 would store one large graph in repository entry location R91 of the dynamic data model definition repository 26. Boxes and lines in the UML diagrams of Tables 1 and 2 specify containment relationships, with a parent being above a child. The numbers associated with each line denote the multiplicity of the relationship (e.g., Instances contain 1 . . . N [one to N] Partitions). Semi-colons in the multiplicity relationships denote a binary condition. For example, the FailoverPolicy can contain either 0, or 1 to N of both of its children because the types of children are mutually exclusive. A single failover policy cannot contain both StandbyNode entries and SystemPair entries in the model. The nodes in the model contain data elements, which specify the represented object's properties. None of these properties are tied to specific cluster manager information. In Table 1, there is a Node block, which can be the parent of an Interface. There is also a Physical Network block, which can also be the parent of an Interface. An Interface resides within a cluster node, which is a computer system, but the Interface is also part of a network. Thus, system 20 can build a graph that is defined by the composition of Tables 1 and 2.

In the exemplary embodiments, the reversible transformations from the config GUI program 102 and the XML file 104 to the data model 106 can be accomplished with no extra information, but the transformation from the data model 106 to the cluster manager software 108 would be poor if done directly. This is because the logic represented in the UML diagram in Tables 1 and 2 are easily understood by the database administrators, i.e., the service provider, but that same logic representation is not easily understandable to the cluster manager applications; and this is because the model stores some information which is not universally stored by cluster managers. These objects and properties are stored by the DB2 instance in a binary configuration file to ensure that the model bijective/reversible arrows ("<->") cluster mapping remains reversible. Thus, referring to FIG. 2 and FIG. 3, the service provider sends the logical definition UML diagram data D1 in a translated version to the cluster manager software 108 that the cluster manager 108 can understand and use.

The exemplary embodiments are directed to how to model configurations of a data model 106 to specify an abstract logical model of how a database cluster looks in terms of database administrators' and/or service providers' ease of understanding and configuration, while providing a translation layer between the abstract logical model and the plurality of cluster managers' applications running on the clusters, where the abstract logical model is translated, and mapping an deploying a modeling solution to uptime requirements, so the cluster managers can support the new cluster configuration modeling solution.

Referring to FIG. 1 and FIG. 3, at operation start 71 of method 70, a service provider operator/user, using an input device such as any one of input devices mouse 29 or keyboard 60, activates and initiates program 41, where method 70 is stored as executable program code on a computer executable medium. The operator/user activates program 41 and performs other selections in method 70 by making entries using keyboard 60 or mouse 29; thus, at operation start 71, the system receives the operator/user initiation and selection signals causing program 41 to be executed by computer workstation processor 22 to perform the operations and sub operations of method 70 of creating and deploying a data model 106 of a plurality of database cluster configuration modeling specifications based on a unified model diagram which provides a definition of the database cluster configuration data model 106 based on the database cluster configuration modeling specification and/or definition. Thus, if display 21 zoomed in on data model 106 and descended into data model 106, what would be rendered would be the logical representation of the UML diagram composing Tables 1 and 2.

Referring to FIGS. 1, 2 and 3, at create database cluster configuration modeling specification operation 72 (herein referred to as ("operation 72"), program 41, executed by system 20, causes system 20 to perform the operations of creating, in the computer workstation processor 22, a database cluster configuration modeling specification data D2, where the database cluster configuration modeling specification data D2 includes objects contained in the unified model diagram providing a definition of a database cluster configuration data model 106, and which form the contents of data model 106, and where the computer workstation processor 22 includes a plurality of interfaces 200, including a configuration graphical user interface program 102, along with a set of application programming interfaces API 110 and API 112.

Referring to FIGS. 1, 2 and 3, at create database cluster configuration model operation 73 (herein referred to as ("operation 73"), program 41 executed by system 20, causes system 20 to perform the operations of creating the database cluster configuration information flow 100 (herein referred to as "cluster config info flow 100") from the database cluster configuration modeling specification data D2; wherein creating the data model 106 includes performing sub operations 74 of receiving the definition of the database cluster configuration data model 106; checking constraints to validate a logical configuration; and transforming a valid logical configuration of an entire logical independent cluster manager application solution. These sub operations are described in more detail below.

Referring to FIGS. 1, 2 and 3, at performing sub operations 74, program 41 executed by system 20, causes computer workstation processor 22 to perform sub operations of receiving, from either the configuration graphical user interface program 102 or from a batch of data from an XML file 104 or from existing database cluster configuration data D3, defining, per the database cluster configuration modeling specification data D2, a database cluster configuration data model 106. When computer workstation processor 22 receives data defining the database cluster configuration modeling specification data D2 via the configuration graphical user interface program 102, computer workstation processor 22 receives a selection signal from the config GUI program 102 that causes program 41 to call the first algorithm A31 to record and/or retrieve data to and/or from dynamic data model definition repository 26. When computer workstation processor 22 receives data defining the database cluster configuration modeling specification data D2 by way of batch data from one or more XML files 104, program 41 calls the second algorithm A32 to supervise the transfer of batch data from the one or more XML files 104 via one or more of the plurality of interfaces 200. When computer workstation processor 22 receives data defining the database cluster configuration modeling specification data D2 from existing database cluster configuration data D3, program 41 causes transfer of, including recording and retrieving, existing database cluster configuration data D3 by the operation of one or more application programming interfaces of the set of application programming interfaces API 110 and API 112. The transfer of data by way of either config GUI program 102 and/or the transfer of batch data by way of XML files 104 and/or the transfer of existing database cluster configuration data D3 by way of one or more application programming interfaces of the set of application programming interfaces API 110 and API 112 includes recording and/or retrieving data to and/or from dynamic data model definition repository 26, including unified modeling language diagram data D1; and/or database cluster configuration modeling specification data D2; and/or existing database cluster configuration data D3; and/or a plurality of node, network, and path data Dn and logical symbolic representations/symbols S1, S2, S3 respectively up to Sn.

Again referring to FIGS. 1, 2 and 3, at performing sub operations 74, program 41 executed by system 20, causes system 20 to perform sub operations of connecting objects and arrows forming the symbolic logical representations comprising a single model of an entire database cluster, i.e., data model 106, where connecting objects includes connecting a set of nodes that store data, where the set of nodes that store data represent a plurality of database cluster instances of hardware system nodes, network interfaces and networks, where the arrows represent database instances of database containment and paths relationships between objects. The system nodes, network interfaces and networks and arrow data along with the use of unified modeling language diagram data D1, database cluster configuration modeling specification data D2 and/or existing database cluster configuration data D3 are accessed by program 41 calling through one of the plurality of algorithms from either first algorithm A31, or second algorithm A32 or up to nth algorithm An to retrieve the plurality of node, network and path data Dn and logical symbolic representations/symbols S1, S2, S3 respectively up to Sn from one or more of the repository entry locations R91, R92, R93 up to repository Rn of dynamic data model definition repository 26. The following code shows the XML modeling schema used in the unified model diagram of the database clustered instance configuration definition shown in Tables 1 and 2 above.

```
<?xml version="1.0" encoding="UTF-8"?>
<xs:schema xmlns:xs="http://www.w3.org/2001/XMLSchema"
elementFormDefault="qualified" attributeFormDefault="qualified">
  <xs:annotation>
    <xs:documentation xml:lang="en">
    DB2 High Availability configuration schema. This schema describes the
elements of DB2 High Availability that are used in the configuration of a HA cluster.
    </xs:documentation>
  </xs:annotation>
  <!-- ================================-->
  <!-- = DB2Cluster element       = -->
  <!-- ================================-->
  <xs:element name="DB2Cluster" type="DB2ClusterType"/>
  <xs:complexType name="DB2ClusterType">
    <xs:annotation>
    <xs:documentation>
    Each DB2 HA configuration document begins with the DB2Cluster element.
```

-continued

This element encapsulates the cluster configuration specification for the instance
        </xs:documentation>
      </xs:annotation>
      <xs:sequence>
        <xs:element name="DB2ClusterTemplate" type="DB2ClusterTemplateType" minOccurs="0" maxOccurs="unbounded"/>
        <xs:element name="ClusterDomain" type="ClusterDomainType" maxOccurs="unbounded"/>
        <xs:element name="FailoverPolicy" type="FailoverPolicyType" minOccurs="1" maxOccurs="1"/>
        <xs:element name="DB2PartitionSet" type="DB2PartitionSetType" maxOccurs="unbounded"/>
      </xs:sequence>
      <xs:attribute name="clusterManagerName" type="xs:string" use="optional"/>
      <xs:attribute name="version" type="xs:string" use="optional"/>
    </xs:complexType>
    <!-- ================================= -->
    <!-- = DB2ClusterTemplate element = -->
    <!-- ================================= -->
    <xs:complexType name="DB2ClusterTemplateType">
      <xs:annotation>
        <xs:documentation>
        The DB2ClusterTemplate type encapsulates parameterization information about the DB2 cluster. It can be used to deploy complex DB2 DPF configurations or roll out a number of similar DB2 HA configurations
        </xs:documentation>
      </xs:annotation>
      <xs:sequence>
        <xs:element name="DB2ClusterTemplateParameter" type="DB2ClusterTemplateParameterType" maxOccurs="unbounded"/>
      </xs:sequence>
    </xs:complexType>
    <!-- ========================================= -->
    <!-- = DB2ClusterTemplateParameter element= -->
    <!-- ========================================= -->
    <xs:complexType name="DB2ClusterTemplateParameterType">
      <xs:annotation>
        <xs:documentation>
        The DB2ClusterTemplateParameter type is used to define the parameters for the cluster template
        </xs:documentation>
      </xs:annotation>
      <xs:sequence>
        <xs:element name="DB2ClusterTemplateParameterException" type="DB2ClusterTemplateParameterExceptionType" minOccurs="0" maxOccurs="unbounded"/>
      </xs:sequence>
      <xs:attribute name="parameterName" type="xs:string" use="required"/>
      <xs:attribute name="parameterValue" type="DB2ClusterTemplateParameterValueType" use="required"/>
    </xs:complexType>
    <!-- =================================================== -->
    <!-- = DB2ClusterTemplateParameterException element = -->
    <!-- =================================================== -->
    <xs:complexType name="DB2ClusterTemplateParameterExceptionType">
      <xs:annotation>
        <xs:documentation>
        The DB2ClusterTemplateParameterException type is used to define the exception element for parameterization
        </xs:documentation>
      </xs:annotation>
      <xs:attribute name="argument" type="xs:integer" use="required"/>
      <xs:attribute name="value" type="xs:string" use="required"/>
    </xs:complexType>
    <!-- =============================================== -->
    <!-- = DB2ClusterTemplateParameterValue element = -->
    <!-- =============================================== -->
    <xs:simpleType name="DB2ClusterTemplateParameterValueType">
      <xs:annotation>
        <xs:documentation>
        The DB2ClusterTemplateParameterValue type is used to define the value for parameterization
        </xs:documentation>
      </xs:annotation>
      <xs:restriction base="xs:string"/>
    </xs:simpleType>
    <!-- ==================================== -->
    <!-- = DB2Instance element      = -->
    <!-- ==================================== -->

-continued

```
        <xs:complexType name="DB2PartitionSetType">
        <xs:annotation>
         <xs:documentation>
        The DB2Instance element encapsulates the cluster confiuguration
specification for the instance
         </xs:documentation>
        </xs:annotation>
        <xs:sequence>
         <xs:element name="DB2Partition" type="DB2PartitionType"
maxOccurs="unbounded"/>
        </xs:sequence>
        <xs:attribute name="resourceGroupName" type="xs:string" use="optional"/>
        <xs:attribute name="clusterDomainName" type="xs:string" use="optional"/>
        <xs:attribute name="type" type="xs:string" use="optional"/>
        <xs:attribute name="failoverNodeSequence" type="xs:string" use="optional"/>
        </xs:complexType>
        <!-- ====================================-->
        <!-- = ClusterDomain element       = -->
        <!-- ====================================-->
        <xs:complexType name="ClusterDomainType">
         <xs:annotation>
         <xs:documentation>
        Each cluster domain can have a number of physical systems (nodes). TSA
currently supports a maximum of 32 nodes per cluster domain. DB2 single partition
instances will typically only have a single cluster domain. In DB2 DPF implementations,
it is not unocmmon to have database partition groups setup for mutual failover in pairs of
nodes where both nodes are in a single cluster domain.
         </xs:documentation>
        </xs:annotation>
        <xs:sequence>
         <xs:element name="Quorum" type="QuorumType" minOccurs="0"/>
         <xs:element name="PhysicalNetwork" type="PhysicalNetworkType"
maxOccurs="unbounded"/>
         <xs:element name="ClusterNode" type="ClusterNodeType"
maxOccurs="unbounded"/>
        </xs:sequence>
        <xs:attribute name="domainName" type="xs:string" use="required"/>
        </xs:complexType>
        <!-- ==========================================-->
        <!-- = Failover policy element        = -->
        <!-- ==========================================-->
        <xs:complexType name="FailoverPolicyType">
         <xs:annotation>
         <xs:documentation>
         The failover policy specifies the failover order of the cluster nodes
         </xs:documentation>
        </xs:annotation>
        <xs:choice>
         <xs:element name="RoundRobin" type="xs:string"/>
         <xs:element name="ActivePassive" type="FailoverPairType"
maxOccurs="unbounded"/>
         <xs:element name="Mutual" type="FailoverPairType"
maxOccurs="unbounded"/>
         <xs:element name="NPlusM" type="StandbyNodeType"
maxOccurs="unbounded"/>
         <xs:element name="LocalRestart" type="xs:string"/>
         <xs:element name="Custom" type="xs:string"/>
        </xs:choice>
        </xs:complexType>
        <!-- ==========================================-->
        <!-- = Failover pair type element        = -->
        <!-- ==========================================-->
        <xs:complexType name="FailoverPairType">
         <xs:attribute name="SystemPairNode1" type="xs:string" use="required"/>
         <xs:attribute name="SystemPairNode2" type="xs:string" use="required"/>
        </xs:complexType>
        <xs:complexType name="StandbyNodeType">
         <xs:attribute name="standbyNodeName" type="xs:string" use="required"/>
        </xs:complexType>
        <!-- ==========================================-->
        <!-- = HADRDB element             = -->
        <!-- ==========================================-->
        <xs:complexType name="HADRDBType">
         <xs:annotation>
         <xs:documentation>
         The HADRDB element lists the HADR databases to be automated for
takeover
         </xs:documentation>
        </xs:annotation>
```

-continued

```
        <xs:sequence>
          <xs:element name="VirtualIPAddress" type="IPAddressType"
minOccurs="0" maxOccurs="unbounded"/>
        </xs:sequence>
        <xs:attribute name="databaseName" type="xs:string" use="required"/>
        <xs:attribute name="resourceGroupName" type="xs:string" use="optional"/>
      </xs:complexType>
      <!-- ===================================================== -->
      <!-- = Quorum element                    = -->
      <!-- ===================================================== -->
      <xs:complexType name="QuorumType">
        <xs:annotation>
          <xs:documentation>
          The quorum specifies the quorum configuration for the cluster domain
          </xs:documentation>
        </xs:annotation>
        <xs:attribute name="quorumDeviceProtocol"
type="QuorumDeviceProtocolType" use="required"/>
        <xs:attribute name="quorumDeviceName" type="xs:string" use="required"/>
      </xs:complexType>
      <!-- ===================================================== -->
      <!-- = Quorum device type element          = -->
      <!-- ===================================================== -->
      <xs:simpleType name="QuorumDeviceProtocolType">
        <xs:annotation>
          <xs:documentation>
          This element type is an enumeration of the quorum types supported.
          </xs:documentation>
        </xs:annotation>
        <xs:restriction base="xs:string">
          <xs:enumeration value="disk"/>
          <xs:enumeration value="scsi"/>
          <xs:enumeration value="network"/>
          <xs:enumeration value="eckd"/>
          <xs:enumeration value="mns"/>
        </xs:restriction>
      </xs:simpleType>
      <!-- ===================================================== -->
      <!-- = Physical network element          = -->
      <!-- ===================================================== -->
      <xs:complexType name="PhysicalNetworkType">
        <xs:annotation>
          <xs:documentation>
          The physical network specifies the network type
          </xs:documentation>
        </xs:annotation>
        <xs:sequence>
          <xs:element name="Interface" type="InterfaceType" minOccurs="2"
maxOccurs="unbounded"/>
          <xs:element name="LogicalSubnet" type="IPAddressType" minOccurs="0"
maxOccurs="unbounded"/>
        </xs:sequence>
        <xs:attribute name="physicalNetworkName" type="xs:string"
use="required"/>
        <xs:attribute name="physicalNetworkProtocol"
type="PhysicalNetworkProtocolType" use="required"/>
      </xs:complexType>
      <!-- ===================================================== -->
      <!-- = Physical network protocol type      = -->
      <!-- ===================================================== -->
      <xs:simpleType name="PhysicalNetworkProtocolType">
        <xs:restriction base="xs:string">
          <xs:enumeration value="ip"/>
          <xs:enumeration value="rs232"/>
          <xs:enumeration value="scsi"/>
          <xs:enumeration value="ssa"/>
          <xs:enumeration value="disk"/>
        </xs:restriction>
      </xs:simpleType>
      <!-- ===================================================== -->
      <!-- = Interface type element            = -->
      <!-- ===================================================== -->
      <xs:complexType name="InterfaceType">
        <xs:sequence>
          <xs:element name="IPAddress" type="IPAddressType"/>
        </xs:sequence>
        <xs:attribute name="interfaceName" type="xs:string" use="required"/>
        <xs:attribute name="clusterNodeName" type="xs:string" use="required"/>
      </xs:complexType>
```

-continued

```
<!-- ================================================== -->
<!-- = IPAddress type element             = -->
<!-- ================================================== -->
<xs:complexType name="IPAddressType">
  <xs:attribute name="baseAddress" type="xs:string" use="required"/>
  <xs:attribute name="subnetMask" type="xs:string" use="required"/>
</xs:complexType>
<!-- ================================================== -->
<!-- = Cluster Node element             = -->
<!-- ================================================== -->
<xs:complexType name="ClusterNodeType">
  <xs:annotation>
    <xs:documentation>
    The cluster node specifies the physical machine/node in the cluster domain
    </xs:documentation>
  </xs:annotation>
  <xs:attribute name="clusterNodeName" type="xs:string" use="required"/>
  <xs:attribute name="type" type="xs:string" use="optional"/>
</xs:complexType>
<!-- ================================================== -->
<!-- = DB2 Partition element             = -->
<!-- ================================================== -->
<xs:complexType name="DB2PartitionType">
  <xs:annotation>
    <xs:documentation>
    The DB2 partition type specifies a DB2 Partition
    </xs:documentation>
  </xs:annotation>
  <xs:sequence>
    <xs:element name="VirtualIPAddress" type="IPAddressType" minOccurs="0" maxOccurs="unbounded"/>
    <xs:element name="Mount" type="MountType" minOccurs="0" maxOccurs="unbounded"/>
    <xs:element name="HADRDB" type="HADRDBType" minOccurs="0" maxOccurs="unbounded"/>
  </xs:sequence>
  <xs:attribute name="instanceName" type="xs:string" use="required"/>
  <xs:attribute name="dbpartitionnum" type="xs:integer" use="required"/>
  <xs:attribute name="resourceName" type="xs:string" use="optional"/>
</xs:complexType>
<!-- ================================================== -->
<!-- = Mount type element             = -->
<!-- ================================================== -->
<xs:complexType name="MountType">
  <xs:attribute name="filesystemPath" type="xs:string" use="required"/>
  <xs:attribute name="filesystemType" type="xs:string" use="optional"/>
  <xs:attribute name="resourceName" type="xs:string" use="optional"/>
</xs:complexType>
</xs:schema>
```

Referring once again to FIGS. 1, 2 and 3, at performing sub operations 74, after the cluster data model 106 is built, program 41 executed by system 20, computer workstation processor 22 to perform sub operations of checking a series of constraints that specify a valid logical configuration for the plurality of database cluster instances of hardware systems nodes, network interfaces and networks. When these constraint tests are satisfied, i.e., the checks pass, then the validated data model 106 cluster configuration can be transformed and/or translated by the service provider in computer workstation processor 22 to output data, that can be transmitted to the plurality of networked computer systems 51 for deployment in their database cluster systems sys 1, sys 2, sys 3 up to sys n.

Model constraints checked are shown in TABLE 3 below. Referring to Tables 1 and 2, as well as Table 3, the constraints described in Table 3 can be written into a routine in program 41 and/or the constraints and the database cluster configuration modeling specification data D2 can be loaded into the dynamic data model definition repository 26, so that the process of building data model 106 can be dynamic, i.e., and enforced programmatically and then accessed programmatically through a routine or an algorithm called by program 41 or through an application programming interface call from API 110 and/or API 112. The information in Tables 1 and 2 describe the form that data model 106 can take, i.e., data model 106 will be in the form of a graph and it has to have the logical structure represented in Tables 1 and 2, but in Tables 1 and 2, constraints on the data within the structure of data model 106 are not addressed in Tables 1 and 2. However, the algorithmic representations in Table 3 place constraints on the data that can be contained with in the nodes of the data model 106. Both, the UML diagram in Tables 1 and 2 and the constraints in Table 3 represent data that show what needs to happen. These data can be loaded into dynamic data model repository definition 26 and then either an algorithm or a routine in program 41 can access and/or operate on the data to make sure the database cluster configuration modeling specification data D2, the existing database cluster configuration data D3, and the constraint data D4 agree with each other and match the specification from the UML diagram. Thus, the data model 106 has to conform to the logical specification represented in the UML diagram described in Tables 1 and 2 and all of the data stored within the data model 106 must conform to the constraints represented in Table 3, in order for the completed data model 106 to be a valid.

TABLE 3

Model Constraints on Data Within Objects

| Element | Constraint | Rationale |
|---|---|---|
| Domain | Unique Name Within a Cluster | Saving the same name for multiple domains is confusing and error prone. |
| Quorum | Reachable Network Address | If a NETWORK quorum type is used, the address given must be pingable within the domain. This test will only be done from the local node. |
| Node | Unique Node Names Across All Domains | The same node can't be in more than one domain. |
| Interface | Node Exists | The LDM must have an entry for the node referenced in the Node attribute of the interface. |
| Interface | Unique Name Within a Node | The same name can not be used for more than one interface on a node. |
| Interface | Base IP Reachable | The IP address designated for base/monitoring purposes must be pingable within the domain. This test will only be done on the local node. |
| Physical Network | Unique Name Within a Domain | Network names are used to generate names for equivalencies. They must therefore be unique within a domain. |
| Subnet | Subnets Unique Across networks in a Single Domain | Routing problems are likely to result from a logical subnet that spans multiple distinct interface interconnections. However, the same subnet can live in different networks in different domains. This occurs when multiple domains are used and all nodes are connected to the same network fabric |
| Instance | Unique Name + ID attributes within a Cluster | IDs will be hostnames in the Python release. This is sufficient to differentiate instances of the same name within the cluster, since DB2 can not support instances of the same name on the same host. |
| Instance | Single Partition For HADR | This is an HADR requirement, and should be validated at the LDM level. |
| System Pair | System Pairs In One Domain | Since partitions can not move between domains, all nodes in the failover node sequence must be in a single domain. Thus, specifying a pair that spans two domains is logically incorrect. |
| Idle Node | All Idle Nodes In A Domain | This is the analogous constraint for idle nodes. |
| HADR DB | Primary and Standby Instances Hosted in Same Domain | Both instances in the HADR pair must reside in the same cluster domain. |
| HADR DB | Remote Instance Is HA Enabled | HADR can not be automated unless both instances in the pair are set up for automatic HA management |
| IP Address | Unique IP Addresses | Can't associate the same IP with multiple groups, or designate an address for virtualization that is reserved for a base address. |
| Partition | Unique Number Within an Instance | This is a DB2 constraint. Should be validated to prevent typo errors in XML input. |
| Partition | Type Matches a Node | The Type attribute's value must match a Type value for a node in the partition's domain. Otherwise the configuration logically states that the partition cannot be hosted anywhere. |
| Partition | All Failover Nodes in Partition's Domain | Since partitions can not move across domain boundaries, all nodes which are set as failover nodes for a partition must be in the same domain. |
| Mount | Known File system Type | File systems that allow concurrent access, such as NFS, should not be added as mount resources in the cluster. Local file systems, such as JFS, need to be added, otherwise the FS will not be accessible after a failover. Thus, if the type is unknown it is not safe to proceed. In practice satisfying this constraint should involve querying the user for the type if it is unknown. |
| Mount | Unique Paths Within a Domain | The runtime component of the solution can not manage the instance unless all partition's groups are shared-nothing. That is, each partition has its own resource group, and no dependencies exist between any two resource groups or their members. This constraint applies between filesystems used by automatically managed DB2 partitions in the cluster, regardless of their parent instances. |

Referring once again to FIGS. 1, 2 and 3, at performing sub operations 74, after checking constraints, program 41 executed by computer workstation processor 22, causes computer workstation processor 22 to perform sub operations of transforming the valid logical data of the cluster configuration of data model 106 to an entire logical independent cluster manager application solution to be output as data and transmitted to any of the three possible input sources (config GUI program 102, XML file 104, and/or cluster manager software 108) as illustrated in FIG. 2. The specifics of the transformation depend on the output target, for manageability and ease of configuration and implementation by the database cluster manager software 108. The overall structure of the system is shown in FIG. 2, where each bidirectional arrow describing a bijective/reversible transformation between one interface to the system and the model. Referring to FIG. 2, the six possible directions of information flow correspond to the following 6 use-cases:

1) Config GUI Program 102->Model: The user is specifying the configuration of their cluster through an interactive configuration interface.

2) Data Model 106->Config GUI Program 102: The user is reviewing the configuration of an existing cluster through an interactive configuration interface.

3) XML File 104->Data Model 106: The user is specifying the configuration of their cluster using an XML file 104.

4) Data Model 106->XML File 104: The user is taking a "snapshot" of the logical configuration of their cluster.

5) Cluster Manager Software 108->Data Model 106: The current configuration of Cluster manager software 108 is being mapped into a logical model.

6) Data Model 106->Cluster Manager Software 108: The logical model is being mapped into the configuration of Cluster Manager Software 108 (i.e., creating or modifying objects in the native configuration model of cluster manager software 108). Cases 5 and 6 rely on a set of application programming interfaces, i.e., API 110 and API 112, to manage the mapping between the cluster and the model.

An example configuration file that could be used with _ any_ cluster manager software 108 that DB2 supports to configure a two system active/passive shared disk cluster is as follows:

Referring once again to FIGS. 1 and 3, at display entire database cluster configuration modeling solution operation 75, program 41 executed by computer workstation processor 22, causes system 20 to display the entire database cluster configuration data model 106 modeling solution on display 21, for review and or editing by the service provider operator or user.

Referring to FIGS. 1 and 3, at transmit entire database cluster configuration modeling solution operation 76, program 41 executed by computer workstation processor 22, causes computer workstation processor 22 to transmit the entire database cluster configuration data model 106 modeling solution providing version-to-version migrations of DB2 instances between cluster manager applications with different specifications and through a unified configuration interface that specifies a single configuration to multiple cluster managers through a single configuration model and provides correction of availability failure in cluster configurations of the plurality of networked computer systems 51.

Referring to FIG. 2, in the exemplary embodiments, bijective/reversible transformations, in regard to the set of bidirectional arrows, include one of receiving a first signal from a user computer system, through the configuration graphical user interface 102, specifying the configuration of a cluster of the user computer system, wherein the configuration graphical user interface 102 is an interactive configuration graphical user interface and receiving a second signal from the user

```
<?xml version="1.0" encoding="UTF-8"?>
<DB2Cluster xmlns:xsi="http://www.w3.org/2001/XMLSchema-instance"
xsi:noNamespaceSchemaLocation="db2ha.xsd" clusterManagerName="TSA"
version="2.1">
    <ClusterDomain domainName="db2domain">
        <Quorum quorumDeviceProtocol="disk" quorumDeviceName="/dev/sdb4"/>
        <PhysicalNetwork physicalNetworkName="db2network"
physicalNetworkProtocol="ip">
            <Interface interfaceName="eth0" clusterNodeName="hasys1">
              <IPAddress baseAddress="9.26.124.33" subnetMask="255.255.255.0"/>
            </Interface>
            <Interface interfaceName="eth1" clusterNodeName="hasys1">
              <IPAddress baseAddress="9.26.125.33" subnetMask="255.255.255.0"/>
            </Interface>
            <Interface interfaceName="eth0" clusterNodeName="hasys2">
              <IPAddress baseAddress="9.26.124.34" subnetMask="255.255.255.0"/>
            </Interface>
            <Interface interfaceName="eth1" clusterNodeName="hasys2">
              <IPAddress baseAddress="9.26.125.34" subnetMask="255.255.255.0"/>
            </Interface>
            <LogicalSubnet baseAddress="9.26.124.0" subnetMask="255.255.255.0"/>
            <LogicalSubnet baseAddress="9.26.125.0" subnetMask="255.255.255.0"/>
            <LogicalSubnet baseAddress="9.26.126.0" subnetMask="255.255.255.0"/>
        </PhysicalNetwork>
        <ClusterNode clusterNodeName="hasys1"/>
        <ClusterNode clusterNodeName="hasys2"/>
    </ClusterDomain>
    <FailoverPolicy>
      <RoundRobin/>
    </FailoverPolicy>
    <DB2PartitionSet>
      <DB2Partition dbpartitionnum="0" instanceName="db2inst">
        <VirtualIPAddress baseAddress="9.26.126.44"
subnetMask="255.255.255.0"/>
        <Mount filesystemPath="/db2data"/>
        <Mount filesystemPath="/home/db2inst1"/>
      </DB2Partition>
    </DB2PartitionSet>
</DB2Cluster>
``` computer system, through the interactive configuration graphical user interface 102, indicating that the user computer system is reviewing the configuration of the existing cluster of the user computer system, and receiving a third signal from the XML file 104 including the batch of data from the user computer system 20, specifying the configuration of the cluster of the user computer system 20, and receiving a fourth signal through the configuration graphical user interface, indicating that the user is actuating the logical snapshot of the user cluster, where the logical snapshot is the case where the logical model of what the cluster configuration data model 106 looks like is transmitted via XML file 104 at a point in time saved in the XML file 104, and receiving a fifth signal from a set of application program interfaces indicating a current configuration of the existing cluster of the user computer system is mapped into a logical model, and receiving a sixth signal from the set of application program interfaces indicating that the logical model is mapped to one of creating and modifying a native configuration model of the cluster of the user computer system.

Referring to FIGS. 1 and 3, at operation 77, program 41, executed by computer workstation processor 22, causes system 20 to either return to any of the above operations and sub operations of method 70 and repeat or continue iteratively processing and performing said operations and sub operations of method 70 of generating a database cluster configuration data model 106 representing a plurality of database cluster configuration modeling solutions or ending the method of generating a database cluster configuration data model 106, because failover problems have been resolved by the provision of the required availability (service uptime) solutions for current applications.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiments disclosed as the best mode contemplated for carrying out this disclosure, but that the disclosure will include all embodiments falling within the scope of the appended claims.

What is claimed is:

1. A method of generating in a computer processor, and deploying a data model of a plurality of database cluster configuration availability solutions over a computer network, the method comprising:

creating, in the computer processor, a database cluster configuration modeling specification, wherein the database cluster configuration modeling specification includes logical symbolic representations providing a definition of a database cluster configuration data model, and wherein the computer processor includes a configuration graphical user interface;

creating the database cluster configuration data model from the database cluster configuration modeling specification; wherein creating the database cluster configuration data model includes performing sub operations of:

receiving, from one of the configuration graphical user interface and from a batch of data from an XML file and from an existing cluster, bijective/reversible data transmissions between object interfaces of the plurality of database cluster instances and the database cluster configuration data model definition the database cluster configuration data model;

checking a series of constraints that specify a valid logical database cluster configuration data model for a plurality of database cluster instances of hardware systems nodes, network interfaces and networks of the database cluster configuration data model; and transforming the valid logical database cluster configuration data model to be output as cluster manager data;

displaying an entire database cluster configuration modeling solution; and transmitting, over the network, the entire database cluster configuration modeling solution, wherein the useful, concrete and tangible result of a complete specification of an entire database cluster configuration modeling solution created, wherein the configuration is specified at a logical level independent of third party cluster manager applications, providing a logical snapshot of the cluster configuration data model, providing version-to-version migrations of DB2 instances between cluster manager applications with different specifications and providing a unified configuration interface that specifies a single configuration to multiple cluster managers through a single configuration model and corrects availability failure in cluster configurations.

2. The method according to claim 1, wherein bijective/reversible transformations, include one of receiving a first signal from a user computer system, through the configuration graphical user interface, specifying the configuration of a cluster of the user computer system, wherein the configuration graphical user interface is an interactive configuration graphical user interface and receiving a second signal from the user computer system, through the interactive configuration graphical user interface, indicating that the user computer system is reviewing the configuration of the existing cluster of the user computer system, and receiving a third signal from the XML file including the batch of data from the user computer system, specifying the configuration of the cluster of the user computer system, and receiving a fourth signal through the configuration graphical user interface, indicating that the user is actuating the logical snapshot of the user cluster, and receiving a fifth signal from a set of application program interfaces indicating a current configuration of the existing cluster of the user computer system is mapped into a logical model, and receiving a sixth signal from the set of application program interfaces indicating that the logical model is mapped to one of creating and modifying a native configuration model of the cluster of the user computer system.

3. The method according to claim 1, further comprising performing one of repeating the method of generating a plurality of database cluster configuration modeling solutions and ending the method of generating a plurality of database cluster configuration modeling solutions.

4. A system generating by a computer processor, and deploying a data model of a plurality of database cluster configuration availability solutions over a computer network, the system comprising:

a computer processor containing a plurality of units including a program unit and at least one algorithm unit, wherein the computer processor is cooperatively coupled to a plurality of network computers, and network storage devices over a network;

a computer executable program residing in the program unit, wherein the computer executable program when executed by the computer processor causes the computer processor to:

create, in the computer processor, a database cluster configuration modeling specification, wherein the database cluster configuration modeling specification includes logical symbolic representations providing a definition of a database cluster configuration data model, and wherein the computer processor includes a configuration graphical user interface;

create the database cluster configuration data model from the database cluster configuration modeling specification; wherein creating the database cluster configuration data model includes performing sub operations of:

receiving, from one of the configuration graphical user interface and from a batch of data from an XML file and from an existing cluster, bijective/reversible data transmissions between object interfaces of the plurality of database cluster instances and the database cluster configuration data model definition the database cluster configuration data model;

checking a series of constraints that specify a valid logical database cluster configuration data model for a plurality of database cluster instances of hardware systems nodes, network interfaces and networks of the database cluster configuration data model; and transforming the valid logical database cluster configuration data model to be output as cluster manager data;

display an entire database cluster configuration modeling solution; and transmit, over the network, the entire database cluster configuration modeling solution, wherein the useful, concrete and tangible result of a complete specification of an entire database cluster configuration modeling solution created, wherein the configuration is specified at a logical level independent of third party cluster manager applications, providing a logical snapshot of the cluster configuration data model, providing version-to-version migrations of DB2 instances between cluster manager applications with different specifications and providing a unified configuration interface that specifies a single configuration to multiple cluster managers through a single configuration model and corrects availability failure in cluster configurations.

5. The system according to claim 4, wherein the computer executable program when executed by the computer processor causes the computer processor to communicate bijective/reversible transformations, including one of receiving a first signal from a user computer system, through the configuration graphical user interface, specifying the configuration of a cluster of the user computer system, wherein the configuration graphical user interface is an interactive configuration graphical user interface and receiving a second signal from the user computer system, through the interactive configuration graphical user interface, indicating that the user computer system is reviewing the configuration of the existing cluster of the user computer system, and receiving a third signal from the XML file including the batch of data from the user computer system, specifying the configuration of the cluster of the user computer system, and receiving a fourth signal through the configuration graphical user interface, indicating that the user is actuating the logical snapshot of the user cluster, and receiving a fifth signal from a set of application program interfaces indicating a current configuration of the existing cluster of the user computer system is mapped into a logical model, and receiving a sixth signal from the set of application program interfaces indicating that the logical model is mapped to one of creating and modifying a native configuration model of the cluster of the user computer system.

6. The system according to claim 4, wherein the computer executable program when executed by the computer processor causes the computer processor to perform one of repeating the method of generating the plurality of graphical images representing the plurality of database cluster configuration modeling solutions and ending the method of generating the plurality of database cluster configuration modeling solutions.

* * * * *